United States Patent
Barnish (10) Patent No.: US 8,543,393 B2
(45) Date of Patent: Sep. 24, 2013

(54) SYSTEMS AND METHODS OF IMPROVING AUTOMATED SPEECH RECOGNITION ACCURACY USING STATISTICAL ANALYSIS OF SEARCH TERMS

(75) Inventor: David M. Barnish, Ramsey, MN (US)

(73) Assignee: Calabrio, Inc., Minneapolis, MN (US)

( * ) Notice: Subject to any disclaimer, the term of this patent is extended or adjusted under 35 U.S.C. 154(b) by 1105 days.

(21) Appl. No.: 12/124,060

(22) Filed: May 20, 2008

(65) Prior Publication Data

US 2009/0292538 A1 Nov. 26, 2009

(51) Int. Cl.
*G10L 15/00* (2013.01)
*G10L 15/04* (2013.01)
*G06F 17/27* (2006.01)

(52) U.S. Cl.
USPC .............................. 704/231; 704/251; 704/9

(58) Field of Classification Search
None
See application file for complete search history.

(56) References Cited

U.S. PATENT DOCUMENTS

| | | | |
|---|---|---|---|
| 4,489,434 A * | 12/1984 | Moshier | 704/239 |
| 4,827,521 A | 5/1989 | Bahl et al. | |
| 4,998,280 A | 3/1991 | Amano et al. | |
| 5,390,278 A | 2/1995 | Gupta et al. | |
| 5,621,859 A | 4/1997 | Schwartz et al. | |
| 5,727,081 A | 3/1998 | Burges et al. | |
| 5,765,133 A | 6/1998 | Antoniol et al. | |
| 5,787,396 A | 7/1998 | Komori et al. | |
| 5,805,832 A | 9/1998 | Brown et al. | |
| 5,825,977 A | 10/1998 | Morin et al. | |
| 5,884,259 A | 3/1999 | Bahl et al. | |
| 6,119,085 A | 9/2000 | Lewis et al. | |
| 6,154,722 A | 11/2000 | Bellegarda | |
| 6,243,678 B1 | 6/2001 | Erhart et al. | |
| 6,256,630 B1 | 7/2001 | Gilai et al. | |
| 6,539,353 B1 | 3/2003 | Jiang et al. | |
| 6,622,121 B1 | 9/2003 | Crepy et al. | |
| 6,735,565 B2 | 5/2004 | Gschwendtner | |
| 6,804,645 B1 | 10/2004 | Kleinschmidt | |
| 6,934,675 B2 | 8/2005 | Glinski et al. | |
| 6,961,701 B2 | 11/2005 | Ogawa et al. | |
| 7,054,814 B2 | 5/2006 | Okutani et al. | |
| 7,072,835 B2 | 7/2006 | Konuma et al. | |
| 7,076,427 B2 | 7/2006 | Scarano et al. | |
| 7,299,179 B2 | 11/2007 | Block et al. | |
| 7,319,960 B2 | 1/2008 | Riis et al. | |
| 2002/0051955 A1 | 5/2002 | Okutani et al. | |

(Continued)

FOREIGN PATENT DOCUMENTS

WO   WO 98/43237   10/1998

OTHER PUBLICATIONS

International Search Report and Written Opinion issued in PCT/Us2009/044491, mailed Jul. 1, 2009.

*Primary Examiner* — Jesse Pullias (74) *Attorney, Agent, or Firm* — Faegre Baker Daniels LLP (57) ABSTRACT

Systems and methods of improving speech recognition accuracy using statistical analysis of word or phrase-based search terms are disclosed. An illustrative system for statistically analyzing search terms includes an interface adapted to receive a text-based search term, a textual-linguistic analysis module that detects textual features within the search term and generates a first score, a phonetic conversion module that converts the search term into a phoneme string, a phonetic-linguistic analysis module that detects phonemic features within the phoneme string and generates a second score, and a score normalization module that normalizes the first and second scores and outputs a search term score to a user or process.

18 Claims, 6 Drawing Sheets

(56) References Cited

U.S. PATENT DOCUMENTS

| | | |
|---|---|---|
| 2002/0128836 A1 | 9/2002 | Konuma et al. |
| 2002/0165715 A1 | 11/2002 | Riis et al. |
| 2002/0194004 A1 | 12/2002 | Glinski et al. |
| 2003/0061043 A1 | 3/2003 | Gschwendtner |
| 2003/0110032 A1 | 6/2003 | Seide |
| 2005/0143970 A1 | 6/2005 | Roth et al. |
| 2005/0261906 A1 | 11/2005 | Glinski et al. |
| 2006/0074662 A1 | 4/2006 | Block et al. |
| 2006/0085187 A1 | 4/2006 | Barquilla |
| 2006/0136207 A1 | 6/2006 | Kim et al. |
| 2006/0149558 A1 | 7/2006 | Kahn et al. |
| 2006/0206324 A1 | 9/2006 | Skilling et al. |
| 2007/0038453 A1 | 2/2007 | Yamamoto et al. |
| 2008/0082334 A1 | 4/2008 | Watson et al. |
| 2008/0082336 A1 | 4/2008 | Duke et al. |
| 2009/0043581 A1 | 2/2009 | Abbott et al. |

\* cited by examiner

SYSTEMS AND METHODS OF IMPROVING AUTOMATED SPEECH RECOGNITION ACCURACY USING STATISTICAL ANALYSIS OF SEARCH TERMS

TECHNICAL FIELD

The present invention relates generally to the analysis of search terms for detection by automated speech recognition systems. More specifically, the present invention relates to systems and methods of evaluating and improving automated speech recognition accuracy using statistical analysis of word or phrase-based search terms.

BACKGROUND

Automated speech recognition (ASR) systems are used for detecting particular words or phrases contained in a voice or audio stream. In customer quality assurance applications, for example, a speech recognition engine may be used in monitoring phone calls between customers and customer service agents to evaluate the quality of customer interactions, and to ensure an adequate level of service is provided. In some applications, the speech recognition engine may also be used to assess in real-time the customer service agent's performance during a phone call. In some situations, the speech recognition engine may also be used to analyze recordings of prior communications to permit a quality compliance manager or supervisor to later assess the quality of the phone call, or to verify or confirm a transaction made during the call. In the financial services industry, for example, the speech recognition engine may be used by broker-dealers to extract information regarding trade confirmations to ensure compliance with the broker-dealer's trading and reporting obligations. Automatic speech recognition systems are also used in a variety of other applications for analyzing speech content.

Software applications that utilize speech recognition engines to detect words or phrases in audio files must often employ carefully tuned search terms to ensure that the output from the engine is accurate and useful. Poorly chosen words, phrases, or other search terms may result in the speech recognition engine not detecting a particular search term within the audio file (i.e., a false negative), or may result in the detection of terms that do not exist in the audio file (i.e., a false positive). Relatively long words such as "imperfection," "constraining," and "international" are more likely to be accurately detected by speech recognition engines than relatively short search terms such as "and," "if," and "me." Multiple word phrases or words containing particular sounds or combination of sounds are also more likely to be accurately detected by speech recognition engines. This is often related to the ease by which the speech recognition engine can correctly identify particular phonemes or groups of phonemes within the audio file. The overall efficacy of the system in accurately detecting particular words or phrases is thus dependent on the phonemic characteristics of the search terms.

The process of training and tuning automated speech recognition engines to accurately detect a list of words or phrases in an audio file is typically accomplished by testing the list of search terms against a recorded audio file, assessing the accuracy of the results or hits detected by the speech recognition engine, making changes to the search terms, and then rerunning the test using the new search terms. This process is often repeated multiple times until the results from the speech recognition engine are deemed to be sufficiently accurate and robust for the application. Such an iterative process of tuning speech recognition systems is often a manual, time intensive process, typically performed by professionals with knowledge of linguistics and speech recognition technology. In some applications, the process of tuning the speech recognition engine to accurately detect search terms may take months or even years to complete, and must be redone as new search terms are added to the system.

SUMMARY

The present invention relates to systems and methods of improving speech recognition accuracy using statistical analysis of word or phrase-based search terms. An illustrative system for statistically analyzing search terms for detection by a speech recognition engine includes an interface adapted to receive a text-based search term, a textual-linguistic analysis module, a phonetic conversion module, a phonemic-linguistic analysis module, and a score normalization module. The textual-linguistic analysis module is adapted to detect one or more textual features within the search term, and then generate a first score associated with the search term correlating to the likelihood that the text of the search term would be accurately detected by a speech recognition engine. The phonetic conversion algorithm is adapted to convert the search term into a phoneme string using a language model dictionary containing a phonetic alphabet. The phonemic-linguistic analysis module is adapted to detect one or more phonemic features from the converted phoneme string, and then generate a second score correlating to the likelihood that the phoneme string would be accurately detected by the speech recognition engine. The score normalization module is adapted to normalize the first and second scores generated by the textual-linguistic analysis module and phonemic-linguistic analysis module, and output a search term score to a user or process.

An illustrative method of statistically analyzing search terms for detection by a speech recognition engine may include the steps of receiving a text-based search from a user or process, analyzing one or more textual features within the search term using the textual-linguistic analysis module, computing a first score associated with the textual features found within the search term, converting the search term into a phoneme string and analyzing one or more phonemic features within the phoneme string using the phonemic-linguistic analysis module, computing a second score associated with the phonemic features found in the phoneme string, and normalizing the first and second scores and outputting a search term score to the user or process. A user or process may then assess whether the search term would be accurately detected in an audio file or stream based on the search term score.

DETAILED DESCRIPTION

Figure 1:
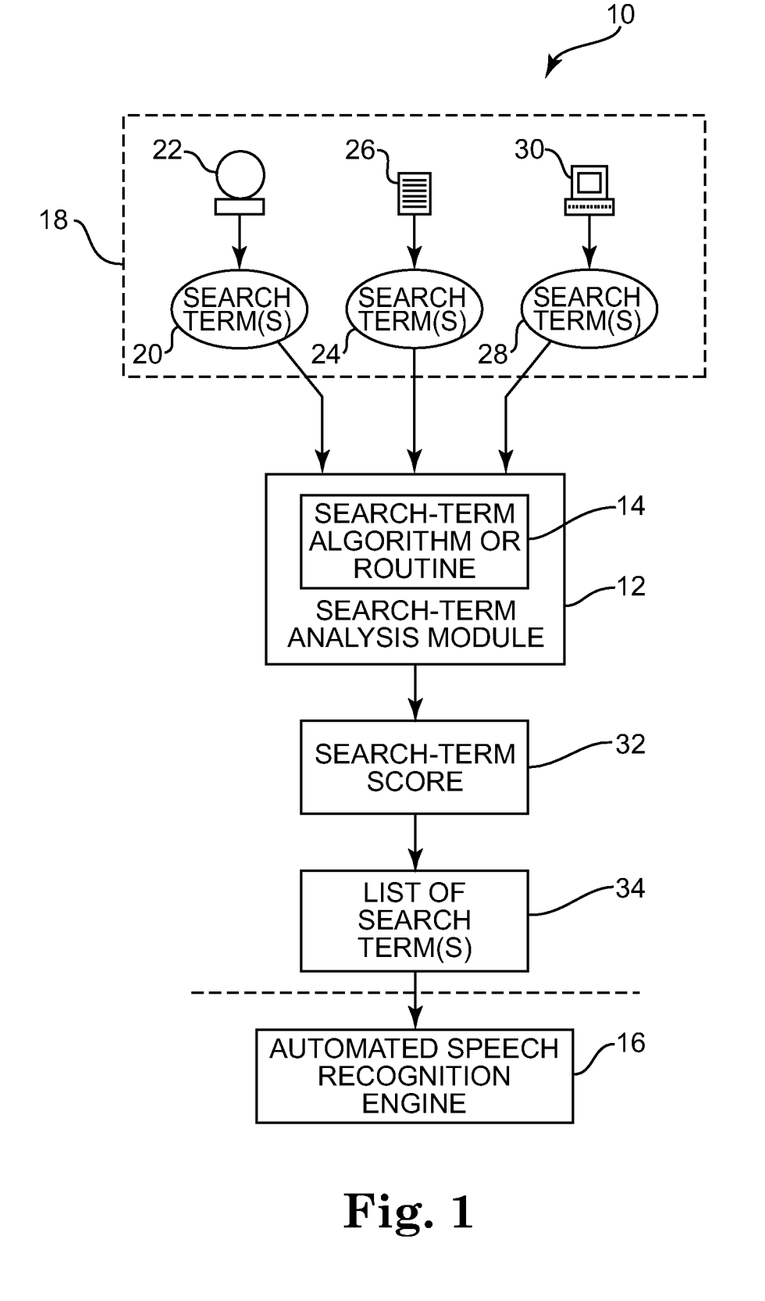
FIG. 1 is a block diagram showing an illustrative system for statistically analyzing search terms for use by an automatic speech recognition engine.

FIG. 1 is a block diagram showing an illustrative system 10 for statistically analyzing the efficacy of search terms for detection by an automated speech recognition engine. As shown in FIG. 1, the system 10 includes a search-term analysis module 12 adapted to run an algorithm or routine 14 for statistically analyzing and evaluating the accuracy of text-based search terms that can be later provided to an automated speech recognition engine 16. In certain applications, for example, the search-term analysis module 12 can be used to assess the likelihood that a word or phrase will be accurately found by a speech recognition engine 16 searching an audio or voice data stream containing the word or phrase, thus allowing a user or process to formulate more effective search terms. In customer service applications, for example, the search-term analysis module 12 can be used to analyze the likelihood that words or phrases uttered during a monitored phone call will be accurately detected by the speech recognition engine 16. This ability to pre-screen certain words or phrases can be used as a tool to reduce the detection of false positives or false negatives by the speech recognition engine 16, thus increasing the ability of the system 10 to accurately detect speech content.

The search-term analysis module 12 can be configured to receive one or more proposed search terms for analysis from a variety of different input sources 18. Text-based search terms 20 may be directly provided to the search-term analysis module 12 from a user 22 via a keyboard, touchpad, graphical user interface, or other suitable input means. In certain embodiments, for example, the search-term analysis module 12 may comprise a component of a computer-executable software program having a graphical user interface that can be used to input text-based search terms into the module 12. The search-term analysis module 12 may also receive text-based search terms 24 programmatically by another process reading from a file or network stream 26. For example, the search-term analysis module 12 can be configured to extract text-based search terms 24 from a computer-readable file, a file accessible on the Internet or an intranet connection, and/ or from other sources. In some embodiments, the search-term 28 may also be provided from another process or module 30 of the system 10 such as from another software and/or hardware module that communicates with the search-term analysis module 12.

The proposed search terms 20,24,28 can comprise a string of text characters appropriate to a particular language to be used by the speech recognition engine 16 in detecting speech content. In certain embodiments, for example, the proposed search terms 20,24,28 may comprise a string of text characters that can be understood by a speech recognition engine 16 adapted to recognize English-based speech content. As used herein, the phrase "search term" may represent a word, a series of words, a phrase, a sentence, or any other speech unit.

The search-term analysis module 12 is configured to analyze the proposed search terms 20,24,28 received from each input source 18 and output a search term score 32 indicating the probability that the search term 20,24,28 would be accurately found by an automated speech recognition engine 16. In certain embodiments, and as discussed further herein, the search-term analysis module 12 can be configured to output a single, bounded search term score 32 that can be provided back to a user or process 22,26,30 for further analysis. For each search term 20,24,28 provided to the search-term analysis module 12, for example, the module 12 may output a numeric score that can then be used by a user or process 22,26,30 to analyze the likelihood that the proposed search term 20,24,28 would be accurately recognized by a speech recognition engine 16. Using this score 32, the user or process 22,26,30 may then assess whether to use the proposed search-term 20,24,28, or provide another proposed search term 20,24,28 to the search-term analysis module 12 for analysis. Based on this feedback, the user or process 22,26,30 may then generate a list of search terms 34 to be detected by the speech recognition engine 16.

Figure 2:
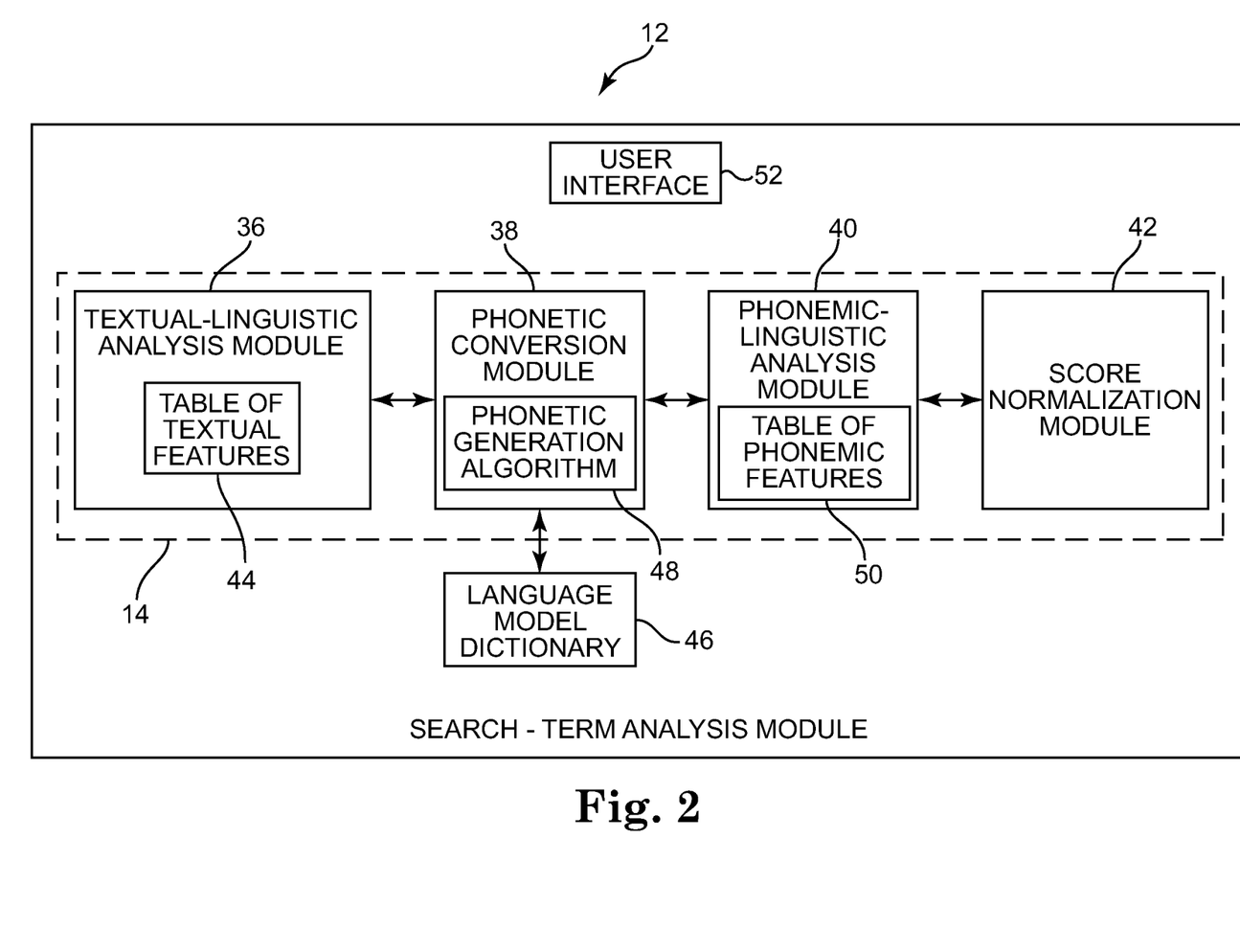
FIG. 2 is a block diagram showing several illustrative components of the search-term analysis module of FIG. 1.

FIG. 2 is a block diagram showing several illustrative components of the search-term analysis module 12 of FIG. 1. As shown in FIG. 2, the search-term analysis module 12 includes a textual-linguistic analysis module 36, a phonetic conversion module 38, a phonemic-linguistic analysis module 40, and a score normalization module 42. The modules 36,38,40,42 may each be embodied in software instructions (e.g., as separate subroutines of the algorithm 14), as hardware instructions or code, or a combination of both. In some embodiments, for example, each of the modules 36,38,40 may comprise separate subroutines or processes that are called by the search-term analysis algorithm 14 to compute various textual and phonemic linguistic parameters associated with the proposed search term 20,24,28, as discussed further herein. The modules 36,38,40 may comprise separate components of the search-term analysis module 12, or may comprise a single, integrated component of the module 12.

The textual-linguistic analysis module 36 is configured to perform an evaluation of proposed search terms 20,24,28 based upon the letters and words that make up the search term 20,24,28. The textual-linguistic analysis module 36 includes a table 44 of textual features to be used by the module 36 for performing a textual analysis on the search term 20,24,28 by analyzing various aspects of the text of the search term 20,24, 28 and then associating a weighting factor for each textual feature found in the search term 20,24,28. Examples of textual features that can be analyzed by the textual-linguistic analysis module 36 include, but are not limited to, the number of words, the number of syllables, the number of letters, the number of diphthongs, the number of monophthongs, the number of vowels, the number of consonants, the number of voiced fricatives, and/or the number of non-voice fricatives contained in the search term 20,24,28. The table 44 may also include other textual features for use in analyzing other aspects of the text within the search term 20,24,28.

The search-term analysis module 12 is further configured to perform a phonemic-linguistic analysis on the search terms 20,24,28 using the phonetic conversion module 38 and the phonemic-linguistic analysis module 40. The phonetic conversion module 38 selects an appropriate language model dictionary 46 to be applied to the search terms 20,24,28 based on configuration settings or runtime information preprogrammed within the module 38, or based on instructions provided to the module 38 from another component or device in communication with the module 38. The phonetic conversion module 38 then performs a phonetic translation of the search terms 20,24,28 based on the particular language model dictionary 46 selected. A phonetic representation of each word within the search term 20,24,28 may be accessed within the language model dictionary 46 using a standard phonetic alphabet. An example phonetic alphabet is the International Phonetic Alphabet (IPA) devised by the International Phonetic Association, which employs a system of phonetic notation that uses a symbol for each distinctive sound or speech segment within a word. An illustrative table showing the IPC phonetic equivalent of the terms "international," "phonetic", and "association" is provided below in Table 1:

TABLE 1

(IPA Phonetic Equivalents)

| Word | IPA Translation |
|---|---|
| international | Intəˈnæʃənəɫ |
| phonetic | fɔ'n tIk |
| association | əsousi'elʃn |

The language model dictionary 46 is a phoneme-based dictionary that contains the phonetic representation of all of the expected words in the proposed search term 20,24,28. Using the language model dictionary 46, the phonetic conversion module 38 translates the proposed search term 20,24, 28 into a phoneme string, which is then used by the phonemic-linguistic analysis module 40 for performing a phonemic analysis on the string. In some embodiments, the output from the phonetic conversion module 38 comprises a single string of phonemes in a standard phonetic alphabet that phonetically represents the proposed search term 20,24,28.

For words not contained in the language model dictionary 46, a phonetic generation algorithm 48 may be used to generate a phoneme string based on the selected language (e.g., English, Spanish, French, German, Chinese, etc.) and the letters found in the proposed search terms 20,24,28. The phonetic generation algorithm 48 may comprise, for example, an algorithm or routine that determines whether the words in the proposed search terms 20,24,28 are contained in the language model dictionary 46, and if not, then automatically converts the search terms 20,24,28 into a phonemic representation based on the particular language selected and the letters in the search term.

The phonemic-linguistic analysis module 40 uses the phoneme string generated by the phonetic conversion module 38 (and in some cases the phoneme string generated by the phonetic generation algorithm 48 for those search terms not contained in the language model dictionary 46) to perform a phonemic-based evaluation of the proposed search terms 20,24,28. The phonemic-linguistic analysis module 40 includes a table 50 of phonemic features each having an associated weighting factor for assessing whether the phoneme string will be accurately detected by the speech recognition engine 16. In certain embodiments, for example, the phonemic-linguistic analysis module 40 can be configured to analyze various phonetic features within the phoneme string using the table 50, and then apply weighting factors to each phonemic feature found to obtain a score indicating the likelihood that the phoneme string will be accurately found by a speech recognition engine 16. Examples of phonemic features that can be analyzed by the phonemic-linguistic analysis module 40 include, but are not limited to, the number of palatal fricatives, the number of velar plosives, the number of trills, the number of glottal fricatives, the number of dental flaps, the number of syllables, the number of bilabial nasals, the number of postalveolar fricatives, the number of retroflex lateral fricatives, the number of phonemes, the number of bilabial plosives, and the number of voiceless labialized velar approximants contained in the phoneme string. The table 50 may also include other phonemic features for use in analyzing other aspects of the search term 20,24,28.

The score normalization module 42 combines the scores obtained by the textual-linguistic analysis module 36 and the phonemic-linguistic analysis module 40 to obtain a single, bounded score representing the probability of the search term 20,24,28 being accurately found by the speech recognition engine 16. In some embodiments, for example, the score normalization module 42 is adapted to output a whole number score in the range of between 0 to 10, representing a probability of between 0 to 100 percent that the search term 20,24,28 will be accurately found by the speech recognition engine 16. If desired, this normalized score can then be outputted to a user or process via an interface 52 (e.g., a graphical user interface) and used as a confirmation of the efficacy of the search term 20,24,28 or as a basis for suggesting alternative search terms for analysis by the search-term analysis module 12.

Figure 3:
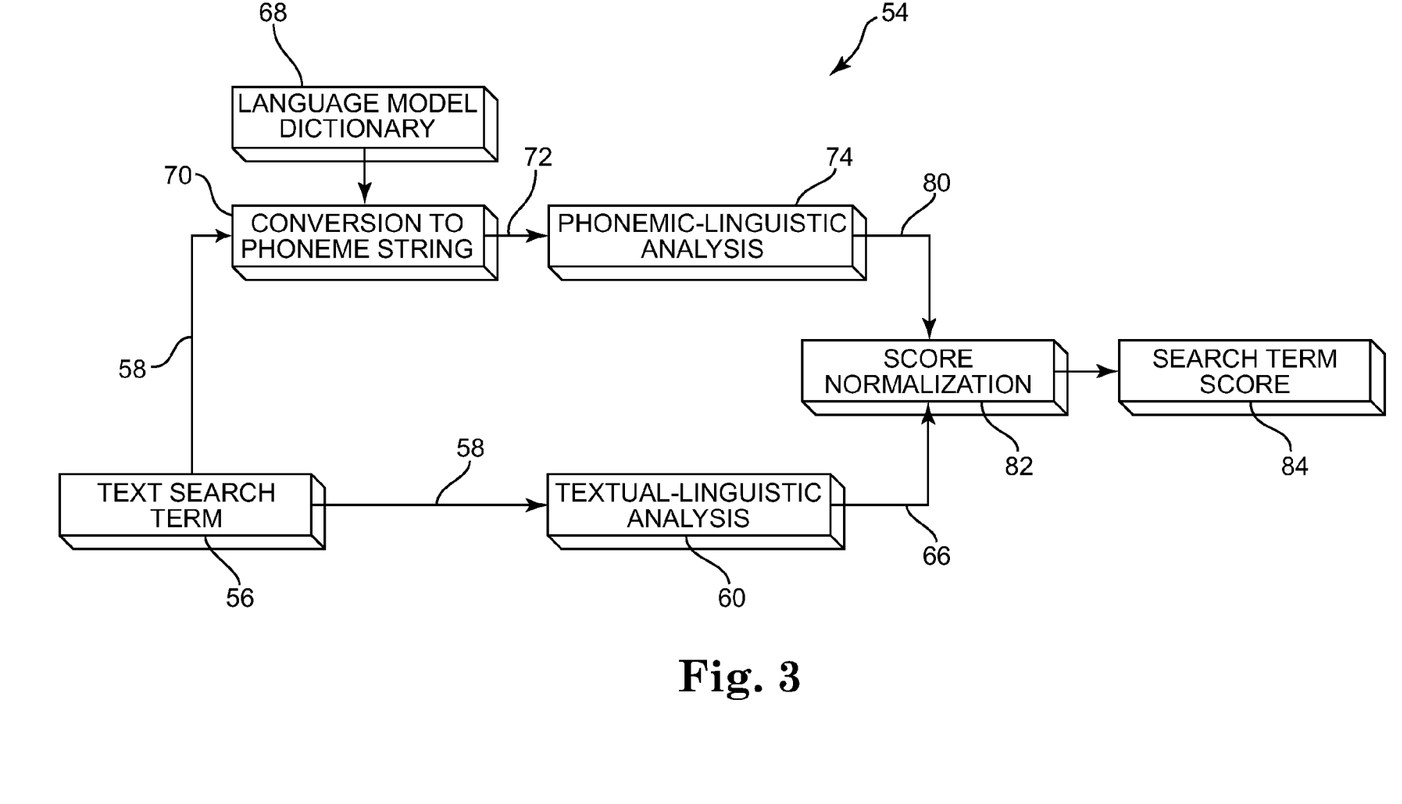
FIG. 3 is a flow chart showing an illustrative method of evaluating a search term score using the search-term analysis module of FIG. 2.

FIG. 3 is a flow chart showing an illustrative method 54 of evaluating a search term probability using the search-term analysis module 12 of FIG. 2. The method 54 may begin generally at block 56 with the step of receiving a text-based search term from a user and/or process. The search term may be generated, for example, directly from a user entering the search term, or by another process reading the search term from a file or network stream. Once a search term is received, the search term is then fed as a text string 58 to the textual-linguistic analysis module 36, which performs a textual-linguistic analysis (block 60) to determine textual features contained within the string 58, and then applies weighting factors to each textual feature found based on whether the presence of the textual feature increases or decreases the likelihood that the search term will be accurately found by the speech recognition engine.

Figure 4:
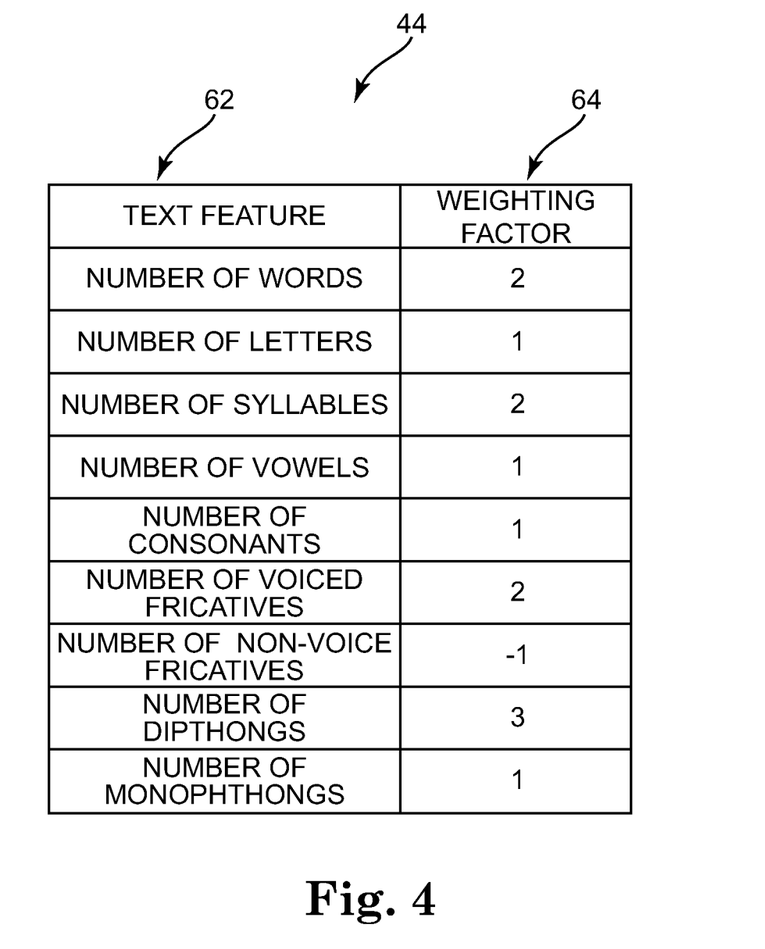
FIG. 4 is a table showing several illustrative textual features and weighting factors for use by the search-term analysis module of FIG. 2.

An exemplary table 44 containing several textual features 62 and corresponding weighting factors 64 is illustrated in FIG. 4. As shown in FIG. 4, for each search term provided to the search-term analysis module 12, the textual-linguistic analysis module 36 extracts one or more textual features 62 related to each search term and applies an associated weighting factor 64 for that feature 62. Illustrative textual features 62 that may be found within the search term include, but are not limited to, the number of words, the number of letters, the number of syllables, the number of vowels, the number of consonants, the number of voiced-fricatives, the number of non-voiced fricatives, the number of diphthongs, and/or the number of monophthongs. A fricative textual feature 62 may represent, for example, a consonant that occurs in the text string 58. A non-voiced fricative textual feature 62, in turn, may represent a consonant that occurs in the text string 58 that is not produced by an individual's vocal chords. A diphthong textual feature 62 may represent, for example, a monosyllabic vowel combination that, during utterance, involves a quick but smooth movement, or glide, from one vowel to another, which is often interpreted by listeners as a single vowel sound or phoneme. A monophthong textual feature 62, in turn, may represent a pure vowel sound whose articulation by an individual at both the beginning and the end is relatively fixed, and which does not glide up or down towards a new position or articulation as in a diphthong.

By way of example and not limitation, a text string 58 provided to the textual-linguistic analysis module 36 may be analyzed to determine if the string 58 contains one or more fricatives. Fricatives are consonants produced by forcing air through a narrow channel made by placing two articulators together. If, for example, the text string 58 contains a voiced fricative such as an [f], which commonly occurs by placing the lower lip and upper teeth together, the textual-linguistic analysis module 36 may associate a fricative textual feature 62 to the text string 58 and then apply a weighting factor (e.g., "2") corresponding to that feature 62. The score associated with this feature may then be added as an ongoing score with each other textual feature detected within the text string 58.

The weighting factors 64 associated with each textual feature 62 in the table 44 correlate to the likelihood that the particular textual feature within the text string 58 will be accurately detected by a speech recognition engine. In certain embodiments, for example, positive weighting factors 64 may be correlated with those textual features 62 within the text string 58 that are likely to be more accurately found by a speech recognition engine whereas negative weighting factors 64 may be correlated to those textual features 62 within the string 58 that are more likely to produce false positives or false negatives. In some embodiments, the values of the weighting factors 64 associated with each textual feature 62 may depend on the type of speech recognition engine employed and the particular language being analyzed. The value of the weighting factors 64 may also vary based on other factors.

In certain embodiments, the positive and negative weighting factors 64 may comprise whole numbers whose value or magnitude varies depending on the likelihood of the textual feature 62 being accurately identified by the speech recognition engine. For example, positive weighting factors that are relatively large may represent textual features 62 that are easily and accurately identifiable by the speech recognition engine. Conversely, negative weighting factors 64 may represent textual features 62 that are more prone to producing false positives or false negatives by the speech recognition engine. In the illustrative table 44 of FIG. 4, for example, a relatively large weighting factor of "2" may be assigned to voiced fricative textual features 62 found in the text string 58. In contrast, a negative weighting factor of "−1" may be assigned to a non-voiced fricative found in the text string 58. In linguistic terms, voiced fricatives are often easier to detect within an audio file or stream than non-voiced fricatives. For example, the word "shazzam" would be easier to accurately detect by a speech recognition engine than the word "tingle" due to the voiced fricatives "sh," "zz," and "m" contained in the word.

While the table 44 in FIG. 4 depicts several illustrative textual features 62, it should be understood that other types of textual features 62 may be analyzed in addition to, or in lieu, of that shown. For example, the number and/or type of textual features 62 used to analyze the text string 58 may vary from that shown. Moreover, the weighting factors 64 associated with each textual feature 62 may also vary from that depicted in the illustrative table 44 of FIG. 4.

The number and/or type of textual features 62 used in analyzing the text string 58 and the weighting factors 64 associated with those features 62 may be adjusted based on experimental and statistical probability analysis. In some embodiments, the number and/or types of textual features 62 analyzed by the textual-linguistic analysis module 36 may be adjusted based on input from a user or process. In certain embodiments, for example, the textual features 62 and weighting factors 64 can be provided to the textual-linguistic analysis module 36 from a user or from another process. In other embodiments, the textual features 62 and weighting factors 64 can be pre-programmed within the textual-linguistic analysis module 36. In those embodiments in which the search-term analysis module 12 is integrated into a software program, for example, the specific textual features 62 and weighting factors 64 analyzed in the text string 58 may be supplied by the program.

In use, the weighting factors 64 applied to each textual feature 62 analyzed by the textual-linguistic analysis module 36 can be used to alter a base score of zero. As further shown in FIG. 3, the textual-linguistic analysis module 36 can be configured to a generate an unbounded score 66 representing the summation of all textual features found in the text string 58 multiplied by their corresponding weighting factor. This can be expressed generally by the following equation:

$$\text{Score}_{TEXT} = \Sigma(\text{TextualFeature} \times \text{WeightingFactor}) \quad (1)$$

The proposed text string 58 may be further provided to the phonetic conversion module 38, which selects an appropriate language model dictionary (block 68) based on configuration or runtime information within the module 38, and converts (block 70) the text string 58 into a phoneme string 72 based on the letters found in the string 58 and the particular language model dictionary 46 selected. In certain embodiments, for example, the phonetic conversion module 38 is configured to convert the text string 58 into a single phoneme string 72 representing all of the letters within the search term. The phonetic conversion module 38 can also be configured to convert the text string 58 into multiple phoneme strings, or into context specific phoneme groups such as biphones or triphones.

The phoneme string 72 translated by the phonetic conversion module 38 represents the pronunciation most likely to be presented to the speech recognition engine. In actual use, however, particular words may be spoken differently based on regional dialects and variations in language. For example, in North America the word "schedule" is commonly pronounced as "sked-yule" whereas in the United Kingdom the word is often pronounced as "shed-yule." This distinction is apparent when the search term is paired with a language model and a phonemic dictionary to obtain a string of phonemic characters that are most likely to be spoken by persons of a certain region or locale. The language model and phonemic dictionary can thus be used to identify the pronunciation most likely to be encountered by a speech recognition system tasked to analyze search terms in that region or locale.

If words within the search term are not contained in the language model dictionary 40, the phonetic generation algorithm 48 may perform a phonetic-based evaluation of the search term, and then automatically generate a phoneme string 72 representing the search term. In certain embodiments, for example, the conversion of words not contained in the language model dictionary 46 may be based on the particular type of language selected (e.g., English, Spanish, French, German, Chinese) and the letters (or letter combinations) contained in the search term.

Once the words in the search term have been translated into a phonemic string 72, the string 72 is then passed to the phonemic-linguistic analysis module 40, which performs an phonemic-linguistic analysis (block 74) to extract phonemic features contained within the string 72, and then applies weighting factors to each phonemic feature found based on whether the feature increases or decreases the likelihood that the search term will be accurately found by a speech recognition engine.

Figure 5:
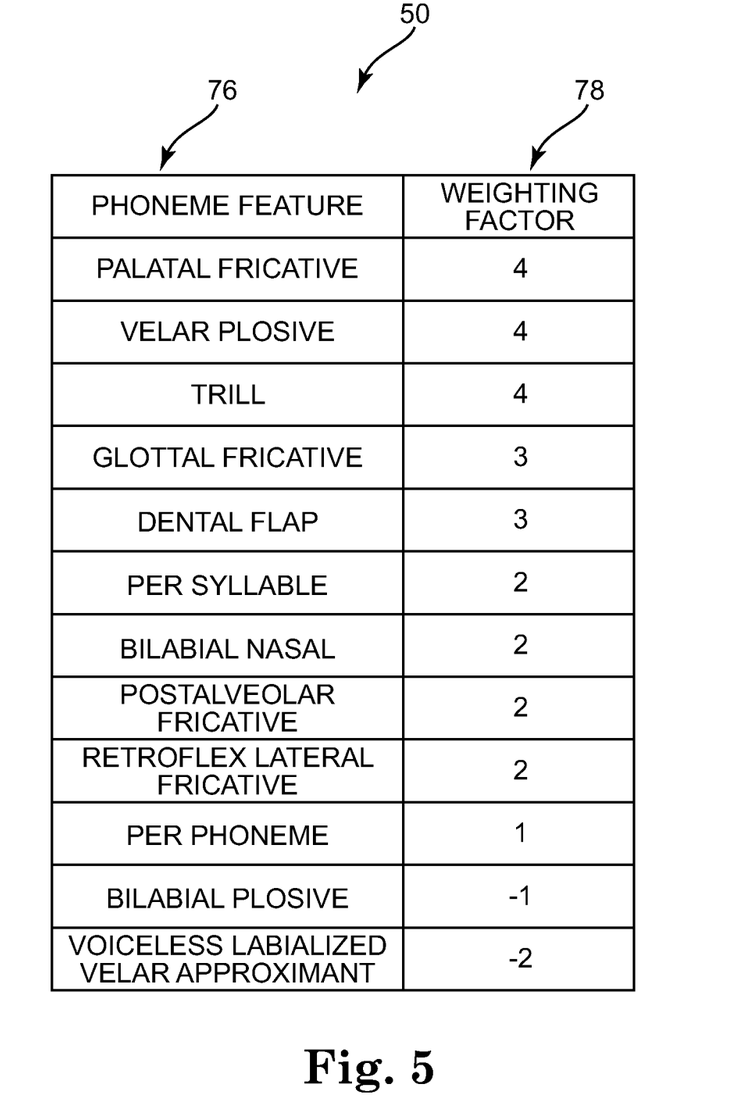
FIG. 5 is a table showing several illustrative phonemic features and weighting factors for use by the search-term analysis module of FIG. 2.

An exemplary table 50 containing several phonemic features and corresponding weighting factors is illustrated in FIG. 5. As shown in FIG. 5, for each phoneme string 72 provided to the phonemic-linguistic analysis module 40, the phonemic-linguistic analysis module 40 extracts one or more phonemic features 76 from the phoneme string 72, and applies an associated weighting factor 78 for that feature 76. Illustrative phonemic features 76 that may be found within the phoneme string 72 include, but are not limited to, the number of palatal fricatives, the number of velar plosives, the number of trills, the number of glottal fricatives, the number of dental flaps, the number of syllables, the number of bilabial nasals, the number of postalveolar fricatives, the number of retroflexive lateral fricatives, the number of phonemes, the number of bilabial plosives, and/or the number of voiceless labialized velar approximants.

The phonemic-linguistic analysis module 40 is configured to apply weighting factors 78 to each phonemic feature found in the phoneme string 72. In certain embodiments, for example, positive weighting factors 78 may be applied to those phonemic features 76 within the phoneme string 72 that are likely to be more accurately found by a speech recognition engine whereas negative weighting factors 78 may be correlated to those phonemic features 78 within the string 72 that are more likely to produce false positives or false negatives. The value or magnitude of the positive and negative weighting factors may be varied based on the type of phonemic features 76 detected within the phoneme string 72. As shown in the illustrative table 50 of FIG. 5, for example, a relatively large weighting factor 78 of "4" may be assigned to a palatal fricative phonemic feature 76 whereas a smaller weighting factor 78 of "2" may be assigned to a postalveolar fricative. This relative value or magnitude of the weighting factors 78 takes into consideration that palatal fricatives are more likely to be accurately found by a speech recognition engine than postalveolar fricatives. In general, the more complex the phoneme string (i.e., the presence and quality of particular phonemes or groups of adjacent phonemes), the more easily the search term will be recognized due to the audio features of the sounds represented by the phonemes.

While the table 50 in FIG. 5 depicts several illustrative phonemic features 76, it should be understood that other types of phonemic features may be analyzed in addition to, or in lieu of, that shown. For example, the number and/or type of phonemic features 76 used to analyze the phoneme string 72 may vary from that shown. Moreover, the weighting factors 78 associated with each phonemic feature 76 may also vary from that depicted in FIG. 5. In some embodiments, the number and/or type of textual features 62 used in analyzing the phoneme string 72 and those weighting factors 78 associated with those features 76 may be adjusted based on experimental and statistical probability analysis. In certain embodiments, the number and/or types of phonemic features 76 analyzed by the phonemic-linguistic analysis module 40 may be adjusted based on input from a user or from another process. In some embodiments, for example, the phonemic features 76 and weighting factors 78 can be provided to the phonemic-linguistic analysis module 40 from a user or another process. In other embodiments, the phonemic features 76 and weighting factors 78 can be pre-programmed within the phonemic-linguistic analysis module 40.

The weighting factors 78 applied to each phonemic feature 76 found by the phonemic-linguistic analysis module 40 can be used to alter a base score of zero, similar to that performed by the textual-linguistic analysis module 36. As further shown in FIG. 3, the phonemic-linguistic analysis module 40 generates an unbounded score 80 representing the summation of all phonemic features found in the phoneme string 72 multiplied by their corresponding weighting factor. This can be expressed generally by the following equation:

$$\text{Score}_{PHONEME} = \Sigma(\text{PhonemicFeature} \times \text{WeightingFactor}) \quad (2)$$

The textual-based score 66 and phoneme-based score 80 can be combined together via the score normalization module 42 (block 82) to obtain a single, bounded search-term score (block 84). In certain embodiments, for example, the textual-based and phoneme-based search scores 66,80 can be normalized together and bounded within a range of between 0 to 10, representing a probability of between 0 percent to 100 percent that the proposed search term will be accurately found by a speech recognition engine. This process of combining the textual-based score 66 and phoneme-based score 80 into a single, normalized score can be expressed generally by the following equation:

$$\text{Score}_{NORMALIZED} = (\text{Score}_{TEXT} \times K_{TEXT} + \text{Score}_{PHONEME} \times K_{PHONEME})/2 \quad (3)$$

where:

$\text{Score}_{NORMALIZED}$ is the normalized score generated by the score normalization module 42;

$\text{Score}_{TEXT}$ is the score 66 generated by the textual-linguistic analysis module 36;

$K_{TEXT}$ is a normalizing constant associated with the text-based score 66;

$\text{Score}_{PHONEME}$ is the score 80 generated by the phonemic-linguistic analysis module 40; and $K_{PHONEME}$ is a normalizing constant associated with the phoneme-based score 80.

As shown in equation (3) above, each of the scores 66,80 can be multiplied by a corresponding normalization constant $K_{TEXT}$, $K_{PHONEME}$, which may be used to weigh the contributions of the individual scores to the normalized search term score 84. The constants are also used to compensate for some of the overlap in the textual and phonemic features analyzed by the textual-linguistic analysis module 36 and phonemic-linguistic analysis module 40. In some embodiments, the normalization constants $K_{TEXT}$, $K_{PHONEME}$ can be provided to the score normalization module 42 by a user or process, or can be pre-programmed within the module 42. In other embodiments, the normalization constants $K_{TEXT}$, $K_{PHONEME}$ can be provided as part of the tables 44,50 containing the textual and phonetic features.

The search term score 84 generated by the score normalization module 42 may be used by a user or process to assess whether the proposed search term 56 would be accurately detected in an audio file or stream by a speech recognition engine. If, for example, the search term score 84 generated in response to a proposed search term 56 is relatively low (e.g., "2"), the user or process may be prompted to input a different or modified search term that is more likely to be accurately detected by the speech recognition engine. Based on this feedback from the search-term analysis module 12, the user or process may then formulate a different search term that is more likely to be detected by the speech recognition engine.

Example

An illustrative implementation of the method 54 of FIG. 3 using two exemplary search terms (1) "I like my coffee black" and (2) "get out" will now be described. At block 56, the user or process provides the search terms to the search-term analysis module 12. From the inputted search terms 56, the textual-linguistic analysis module 36 performs a textual analysis on the search terms to identify and extract textual features contained within the search terms 56. Identification and extraction of the textual features within the search term 56 can be accomplished, for example, by comparing the search term text against a table 44 of textual features 62 as discussed above, for example, with respect to FIG. 4. Table 2 below illustrates an exemplary list of textual features that can be identified and extracted from each of the above search term examples:

TABLE 2

(List of Textual Features)

| Text Features | Search Term (1): "I like my coffee black" | Search Term (2): "Get out" |
|---|---|---|
| Number of words | 5 | 2 |
| Number of letters | 18 | 6 |
| Number of syllables | 6 | 2 |
| Number of vowels | 8 | 3 |
| Number of consonants | 10 | 3 |
| Number of voiced fricatives | 3 | 0 |
| Number of non-voice fricatives | 4 | 3 |
| Number of dipthongs | 3 | 1 |
| Number of monophthongs | 3 | 1 |

Based on the extracted textual features shown in Table 2, the textual-linguistic analysis module 36 then computes a score 66 based on the weighting factors corresponding to each textual feature. This can be seen, for example, in Table 3 below, which shows the computation of adjustments for each textual feature extracted from the search term:

TABLE 3

(Computation of Adjustments for Extracted Textual Features)

| Text Feature | Weighting Factor | "I like my coffee black" | "get out" |
|---|---|---|---|
| Number of words | 2 | 10 | 4 |
| Number of letters | 1 | 18 | 6 |
| Number of syllables | 2 | 12 | 4 |
| Number of vowels | 1 | 8 | 3 |
| Number of consonants | 1 | 10 | 3 |
| Number of voiced fricatives | 2 | 6 | 0 |
| Number of non-voice fricatives | −1 | −4 | −3 |
| Number of dipthongs | 3 | 9 | 3 |
| Number of monophthongs | 1 | 3 | 1 |
| Total Adjustment (Score) | | 72 | 21 |

Thus, as can be seen from Table 3, a total adjustment or score 66 can be provided for each search term comprising the sum of all textual features contained within the search term multiplied by their corresponding weighting factor. This score 66 represents an unbounded score associated with the probably of the search term being accurately detected by a speech recognition engine.

A similar process of applying weighting factors to phonemic features found within the search term is also performed in order to obtain a phonemic score 80. At block 68, the phonetic conversion module 38 selects an appropriate language model from a language model dictionary, and then converts (block 70) the search terms into phoneme strings 72 based on the letters found in the search terms and the particular language model selected. Table 4 below illustrates an exemplary phoneme string translation based on the exemplary search terms:

TABLE 4

(Phoneme String Translation of Search Terms)

| Search Term Text | Converted Phoneme String |
|---|---|
| I like my coffee black | AY . L AY K . M AY . K AA F IY . B L AE K |
| Get out | G EH T . AW T . |

From the phonetic translation of the search term into a phoneme string 72, the phonemic-linguistic analysis module 40 performs a phonemic analysis on the string 72 to identify and extract phonemic features contained within the string 72. Identification and extraction of the phonetic features within the phonetic string can be accomplished, for example, by comparing the phoneme string 72 against phonemic features contained in a table 50 of phonemic features as discussed above, for example, with respect to FIG. 5. Table 5 below illustrates an exemplary list of phonemic features that can be identified and extracted from each of the above search term examples:

TABLE 5

(List of Phonemic Features)

| Phonetic Features | Search Term 1: "I like my coffee black" | Search Term 2: "Get out" |
|---|---|---|
| Number of Bilabial Nasals | 1 | 0 |
| Number of Bilabial Plosives | 1 | 0 |
| Number of Dipthongs | 3 | 1 |
| Number of Glides | 3 | 0 |
| Number of Labioden Fricatives | 1 | 0 |
| Number of Lateral Approximants | 2 | 0 |
| Number of Monophthongs | 3 | 1 |
| Number of Non-voiced Fricatives | 4 | 3 |
| Number of phonemes | 13 | 4 |
| Number of stops | 4 | 1 |
| Number of Palatal Plosives | 3 | 0 |
| Number of Voiced Fricatives | 3 | 0 |

Based on the extracted phonemic features shown in Table 5, the phonemic-linguistic analysis module 40 then computes a score 80 based on the weighting factors associated with each phonetic feature. This can be seen in Table 6 below, which shows the computation of adjustments for each phonemic feature extracted from the phoneme string:

TABLE 6

(Computation of Adjustments for Extracted Phonemic Features)

| Text Feature | Weighting Factor | "AY . L AY K . M AY . K AA F IY . B L AE K" | "G EH T . AW T ." |
|---|---|---|---|
| Bilabial Nasals | 1 | 1 | 0 |
| Bilabial Plosives | −1 | −1 | 0 |
| Dipthongs | 3 | 9 | 3 |
| Glides | 2 | 6 | 0 |
| Labioden Fricatives | 1 | 1 | 0 |
| Lateral Approximants | 1 | 2 | 0 |
| Monophthongs | 2 | 6 | 2 |
| Non-voiced Fricatives | −2 | −8 | −6 |
| Phonemes | 2 | 26 | 8 |
| Stops | 1 | 4 | 1 |
| Palatal Plosives | −1 | −3 | 0 |
| Voiced Fricatives | 2 | 6 | 0 |
| Total Adjustment (Score) | | 49 | 8 |

The score normalization module 42 may then compute normalized scores using the total adjusted text and phoneme scores shown in Tables 3 and 6 and the normalization constants. Assuming, for example, normalization constants $K_{TEXT}$, $K_{PHONEME}$ of 0.14 and 0.12, respectively, the normalized scores 84 for the above search term examples are as follows:

Search Term (1): "I like my coffee black"

$$Score_{Normalized} = ((72 \times 0.14) + (49 \times 0.12))/2 = 7.98$$

Search Term (2): "Get out"

$$Score_{Normalized} = ((21 \times 0.14) + (8 \times 0.12))/2 = 1.95$$

Each of these normalized scores 84 can be rounded up to 8 and 2, respectively, representing an 80 and 20 percent probability of the search term being accurately found by a speech recognition engine. For example, the normalized search rating score of 8 for the search term "I like my coffee black" represents an 80 percent probability that the search term will be accurately detected by a speech recognition engine. These normalized search rating scores 84 may then be provided to a user or process for further evaluation, if desired.

Figure 6:
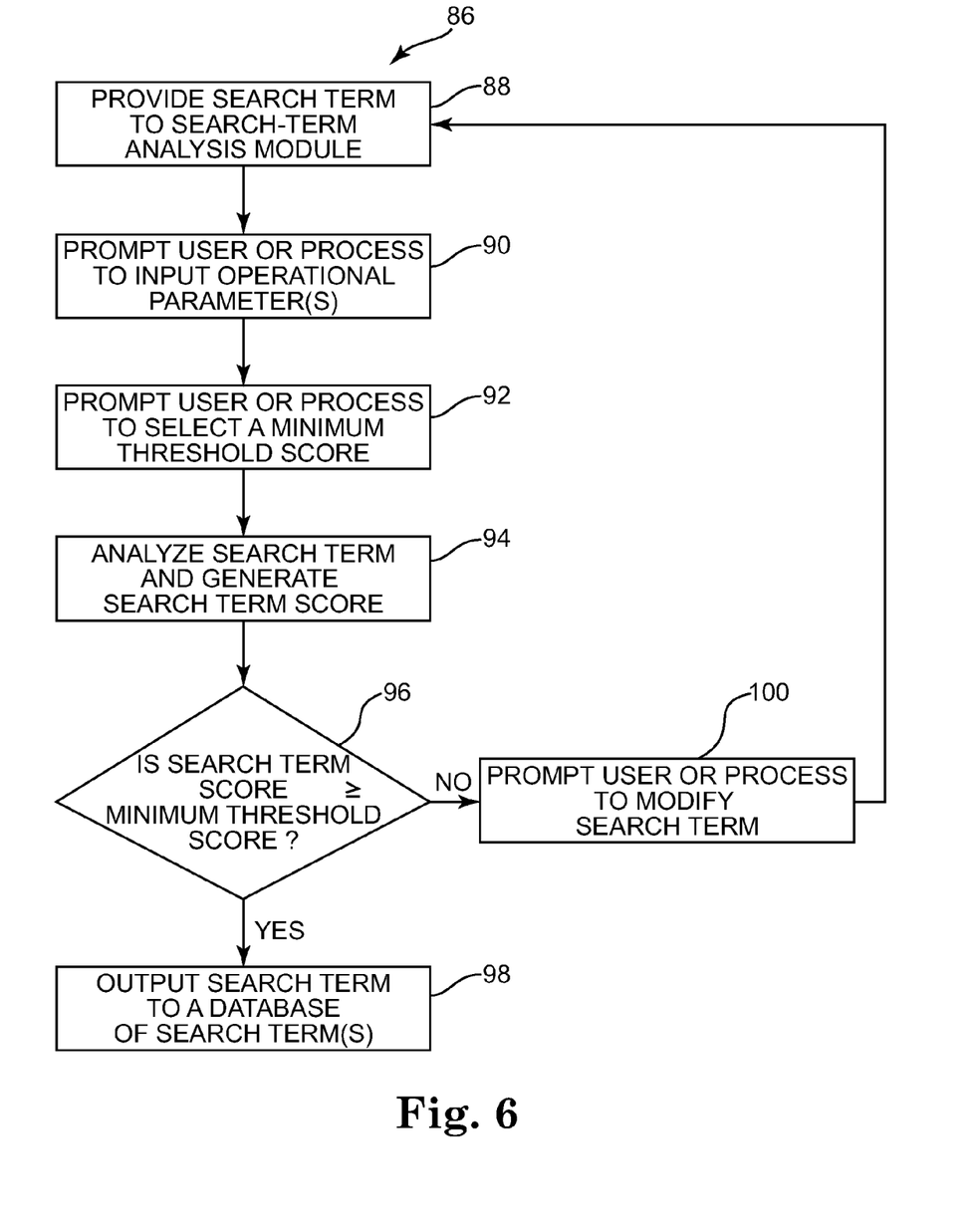
FIG. 6 is a flow chart showing an illustrative method of using the search-term analysis module of FIG. 2 to formulate search terms for use with a speech recognition engine.

FIG. 6 is a flow chart showing an illustrative method 86 of using the search-term analysis module 12 to formulate search terms to be recognized in an audio file or stream by a speech recognition engine. The method 86 may begin generally at block 88 with the step of providing a search term to the search-term analysis module 12 for analysis. The search term may be provided to the search-term analysis module 12 directly by a user using a keyboard, touchpad, graphical user interface, or other suitable input means. Alternatively, or in addition, the search term may be provided by reading a file or network stream containing the search term. In some embodiments, multiple search terms may be provided to the search-term analysis module 12 for analysis.

The search-term analysis module 12 may prompt the user or process to input various operational parameters relating to the analysis to be performed on the search term (block 90). In some embodiments, for example, the search-term analysis module 12 may prompt the user or process to select the particular textual features to be analyzed by the textual-linguistic analysis module 36 in performing a textual-linguistic analysis on the search term, the specific language model dictionary to be used in translating the search term into a phonemic string, and the phonemic features to be analyzed by the phonemic-linguistic analysis module 40 in performing a phonemic-linguistic analysis on the search term. The search-term analysis module 12 may further prompt the user or process to select other operating parameters such as the particular weighting factors to be applied to each textual and phonemic feature found, and the normalization constants to be applied to the scores generated by the textual-linguistic and phonemic-linguistic analysis modules 36,40. In some embodiments, for example, the user or process may be prompted to select between one of several different tables of textual features, phonemic features, and/or normalization constants to be applied in analyzing the search term.

The search-term analysis module 12 may further prompt the user or process to select a threshold criteria (block 92) to be associated with the search term score generated by the score normalization module 42. In some embodiments, for example, the search-term analysis module 12 may prompt the user or process to select a minimum threshold score (e.g., "5") at which a search term is deemed sufficiently accurate for detection by a speech recognition engine. In other embodiments, a default threshold score may be suggested to the user or process, which can then be either accepted by the user or process or altered. Once a threshold score is selected, the search-term analysis module 12 may then perform an analysis on the search term and generate a normalized search term score for each inputted search term (block 94). If the search-term analysis module 12 determines that the actual score is at or above the minimum threshold score (block 96), the module 12 may output the proposed search term to a database containing a list of search terms (block 98). Otherwise, if the search-term analysis module 12 determines that the actual score is below the minimum threshold score, the module 12 may prompt the user or process (block 100) to input an alternative search term to the module 12 for analysis. The process of providing search terms to the search-term analysis module 12 may then be repeated for each additional search term to be analyzed.

What is claimed is:

1. A system of statistically analyzing search terms for detection by a speech recognition engine, comprising
   an interface adapted to receive a text-based search term;
   a textual-linguistic analysis module adapted to detect one or more textual features within the search term and generate a first numeric score associated with the search term, the first numeric score comprising an unbounded score representing the sum of all textual features contained within the search term;
   a phonetic conversion module adapted to convert the text-based search term into a phoneme string;
   a phonemic-linguistic analysis module adapted to detect one or more phonemic features within the phoneme string and generate a second numeric score associated with the search term, the second numeric score comprising an unbounded score representing the sum of all phonemic features contained within the phoneme string;
   a score normalization module adapted to normalize the first and second numeric scores and output a numeric search term score to a user or process, wherein the numeric search term score correlates with a probability that the search term will be accurately identified by a speech recognition engine.

2. The system of claim 1, wherein the phonetic conversion module includes a language model dictionary and a phonetic alphabet.

3. The system of claim 2, further including a phonetic generation algorithm or routine adapted to generate a phoneme string for phonemes not contained in the language model dictionary.

4. The system of claim 1, wherein the textual-linguistic analysis module includes a table of textual features and associated weighting factors.

5. The system of claim 4, wherein each textual feature within the search term is adjusted by a corresponding weighting factor.

6. The system of claim 1, wherein the phonemic-linguistic analysis module includes a table of phonemic features and associated weighting factors.

7. The system of claim 6, wherein each phoneme feature within the phoneme string is adjusted by a corresponding weighting factor.

8. The system of claim 1, wherein the search term score is a whole number score.

9. The system of claim 1, wherein the system is a computer-assisted system.

10. A method of statistically analyzing search terms for detection by a speech recognition engine, comprising:
    receiving a text-based search term from a user or process;
    analyzing one or more textual features within the search term using a textual-linguistic analysis module;
    computing a first numeric score associated with the one or more textual features within the search term, the first numeric score comprising an unbounded score representing the sum of all textual features contained within the search term;
    converting the search term into a phoneme string and analyzing one or more phonemic features within the phoneme string using a phonemic-linguistic analysis module;
    computing a second numeric score associated with the one or more phonemic features within the phoneme string, the second numeric score comprising an unbounded score representing the sum of all phonemic features contained within the phoneme string; and normalizing the first and second numeric scores and outputting a numeric search term score to the user or process, wherein the numeric search term score correlates with a probability that the search term will be accurately identified by a speech recognition engine.

11. The method of claim 10, wherein computing a first score associated with the one or more textual features within the search term includes applying weighting factors to each textual feature.

12. The method of claim 10, wherein the first score correlates to the likelihood that the text of the search term will be accurately detected by a speech recognition engine.

13. The method of claim 10, wherein computing a second score associated with the one or more phonemic features within the phoneme string includes applying weighting factors to each phonemic feature.

14. The method of claim 10, wherein the second score correlates to the likelihood that the phoneme string will be accurately detected by a speech recognition engine.

15. The method of claim 10, wherein converting the search term into a phoneme string is accomplished using a phonetic conversion module and a language model dictionary.

16. The method of claim 10, wherein normalizing the first and second scores includes applying normalization constants to the first and second scores.

17. The method of claim 10, wherein the method is a computer-assisted method executable on a computer-readable medium.

18. A method of statistically analyzing search terms for detection by a speech recognition engine, comprising:
  providing a text-based search term to a search-term analysis module including a textual-linguistic analysis module and a phonemic-linguistic analysis module;
  performing a textual-linguistic analysis of the search term and generating a first numeric score based on one or more textual features found in the search term, the first numeric score representing the sum of all textual features contained within the search term;
  converting the search term into a phoneme string;
  performing a phonemic-linguistic analysis of the search term and generating a second numeric score based on one or more phonemic features found in the phoneme string, the second numeric score comprising an unbounded score representing the sum of all phonemic features contained within the phoneme string;
  normalizing the first and second numeric scores and outputting a search term score correlating with a probability that the search term will be accurately identified by a speech recognition engine;
  comparing the search term score against a threshold search term score, the threshold search term score corresponding to a threshold probability of identifying speech within a search term; and
  outputting the search term to a database if the search term score is at or above the threshold search term score.

* * * * *